(12) United States Patent
Block et al.

(10) Patent No.: US 7,492,565 B2
(45) Date of Patent: Feb. 17, 2009

(54) BANDPASS FILTER ELECTROSTATIC DISCHARGE PROTECTION DEVICE

(75) Inventors: Christian Block, Stainz (AT); Holger Flühr, Graz (AT); Kurt Wiesbauer, Kalsdorf (AT); Johann Riedler, Deutschlandsberg (AT); Heinz Ragossnig, Gross St. Florian (AT); Heinz Florian, Bad Gams (AT); Günther Greier, Graz-St. Peter (AT)

(73) Assignee: EPCOS AG, Munich (DE)

( * ) Notice: Subject to any disclaimer, the term of this patent is extended or adjusted under 35 U.S.C. 154(b) by 307 days.

(21) Appl. No.: 10/490,914

(22) PCT Filed: Sep. 27, 2002

(86) PCT No.: PCT/DE02/03662

§ 371 (c)(1),
(2), (4) Date: Aug. 19, 2004

(87) PCT Pub. No.: WO03/030382

PCT Pub. Date: Apr. 10, 2003

(65) Prior Publication Data

US 2004/0264095 A1 Dec. 30, 2004

(30) Foreign Application Priority Data

Sep. 28, 2001 (DE) .................. 101 48 016

(51) Int. Cl.
*H02H 9/00* (2006.01)
(52) U.S. Cl. .......................... 361/119; 361/56
(58) Field of Classification Search .................. 361/56, 361/91.1, 111, 117–120; 455/78
See application file for complete search history.

(56) References Cited

U.S. PATENT DOCUMENTS

| 3,587,017 | A | 6/1971 | Kurusu |
| 3,728,731 | A | 4/1973 | Choi et al. |
| 3,934,175 | A | 1/1976 | Clark |
| 3,968,411 | A | 7/1976 | Mueller |
| 4,007,355 | A | 2/1977 | Moreno |
| 4,303,911 | A | 12/1981 | Hulick |
| 4,399,557 | A | 8/1983 | Muszkiewicz |
| 4,525,863 | A | 6/1985 | Stites |

(Continued)

FOREIGN PATENT DOCUMENTS

DE        31 35 515        6/1982

(Continued)

OTHER PUBLICATIONS

Benz et al., "Tabellenbuch Radio—und Fernsehtechnik Funkelektronik", XP002232831, Kieser-Verlag, Neusäss, p. 130, 135, 286 (1993).

(Continued)

*Primary Examiner*—Michael Sherry
*Assistant Examiner*—Danny Nguyen
(74) *Attorney, Agent, or Firm*—Fish & Richardson P.C.

(57) ABSTRACT

A circuit array includes an antenna input, a signal input, a signal output, and a switch unit. The switch unit connects the antenna to either the signal input or the signal output. The antenna input is connected to a first productive device. The first protective device is a band-pass filter in a T configuration.

24 Claims, 2 Drawing Sheets

U.S. PATENT DOCUMENTS

| | | |
|---|---|---|
| 4,573,168 A | 2/1986 | Henze et al. |
| 4,695,283 A | 9/1987 | Aldinger |
| 4,739,436 A | 4/1988 | Stefani et al. |
| 4,758,805 A | 7/1988 | Yamazaki et al. |
| 4,759,051 A | 7/1988 | Han |
| 4,783,846 A | 11/1988 | Wachob |
| 4,999,595 A * | 3/1991 | Azumi et al. ............... 333/184 |
| 5,053,910 A | 10/1991 | Goldstein |
| 5,122,878 A | 6/1992 | Heigl et al. |
| 5,179,731 A | 1/1993 | Trankle et al. |
| 5,203,019 A | 4/1993 | Rinderle |
| 5,321,573 A | 6/1994 | Person et al. |
| 5,323,332 A | 6/1994 | Smith et al. |
| 5,473,293 A | 12/1995 | Yoshikazu et al. |
| 5,488,540 A | 1/1996 | Hatta |
| 5,523,716 A * | 6/1996 | Grebliunas et al. .......... 330/149 |
| 5,532,897 A | 7/1996 | Carpenter |
| 5,576,920 A | 11/1996 | Kosuga et al. |
| 5,583,734 A | 12/1996 | McMills et al. |
| 5,625,894 A | 4/1997 | Jou |
| 5,628,850 A | 5/1997 | Sanchez et al. |
| 5,630,223 A | 5/1997 | Bahu et al. |
| 5,675,468 A | 10/1997 | Chang |
| 5,689,818 A * | 11/1997 | Caglio et al. ................. 455/83 |
| 5,742,896 A * | 4/1998 | Bose et al. .................. 455/133 |
| 5,783,976 A | 7/1998 | Furutani et al. |
| 5,815,804 A | 9/1998 | Newell et al. |
| 5,889,308 A | 3/1999 | Hong et al. |
| 5,903,421 A | 5/1999 | Furutani et al. |
| 5,926,075 A | 7/1999 | Hayashi |
| 5,982,253 A | 11/1999 | Perrin et al. |
| 5,995,387 A | 11/1999 | Takahashi et al. |
| 6,060,960 A | 5/2000 | Tanaka et al. |
| 6,100,606 A | 8/2000 | Nakahata et al. |
| 6,100,776 A | 8/2000 | Furutani et al. |
| 6,111,478 A | 8/2000 | Furutani et al. |
| 6,114,848 A | 9/2000 | Suto et al. |
| 6,236,551 B1 | 5/2001 | Jones et al. |
| 6,243,247 B1 | 6/2001 | Akdag et al. |
| 6,289,204 B1 | 9/2001 | Estes et al. |
| 6,320,547 B1 | 11/2001 | Fathy et al. |
| 6,335,641 B1 | 1/2002 | Tougou |
| 6,407,614 B1 | 6/2002 | Takahashi |
| 6,445,262 B1 | 9/2002 | Tanaka et al. |
| 6,456,172 B1 | 9/2002 | Ishizaki et al. |
| 6,512,427 B2 * | 1/2003 | Nakano ....................... 333/132 |
| 6,570,469 B2 | 5/2003 | Yamada et al. |
| 6,590,263 B2 | 7/2003 | Gossner |
| 6,608,547 B1 | 8/2003 | Greier et al. |
| 6,633,748 B1 | 10/2003 | Watanabe et al. |
| 6,657,827 B1 * | 12/2003 | Fukuda et al. ............... 360/323 |
| 6,731,184 B1 * | 5/2004 | Muto et al. .................. 333/103 |
| 6,738,609 B1 | 5/2004 | Clifford |
| 6,745,046 B1 * | 6/2004 | Eckert et al. ............. 455/552.1 |
| 6,759,925 B2 | 7/2004 | Satoh et al. |
| 6,795,714 B1 | 9/2004 | Fickenscher et al. |
| 6,831,528 B2 | 12/2004 | Nagata et al. |
| 6,847,803 B1 | 1/2005 | Rauhala et al. |
| 6,856,213 B2 | 2/2005 | Tsurunari et al. |
| 6,987,984 B1 | 1/2006 | Kemmochi et al. |
| 7,027,777 B2 | 4/2006 | Uriu et al. |
| 7,027,779 B2 | 4/2006 | Tai et al. |
| 7,057,472 B2 | 6/2006 | Fukamachi et al. |
| 7,221,922 B2 | 5/2007 | Kemmochi et al. |
| 7,343,137 B2 | 3/2008 | Block et al. |
| 2001/0004767 A1 | 6/2001 | Gordon et al. |
| 2001/0027091 A1 * | 10/2001 | Kimishima ................. 455/209 |
| 2002/0090974 A1 | 7/2002 | Hagn |
| 2002/0121668 A1 | 9/2002 | Gossner |
| 2003/0181174 A1 | 9/2003 | Takagi |
| 2004/0032706 A1 | 2/2004 | Kemmochi et al. |
| 2004/0130388 A1 | 7/2004 | Block et al. |
| 2004/0145849 A1 * | 7/2004 | Chang et al. ................. 361/120 |
| 2004/0246168 A1 | 12/2004 | Isaji |
| 2004/0257740 A1 | 12/2004 | Block et al. |
| 2004/0266378 A1 | 12/2004 | Fukamachi et al. |
| 2005/0059358 A1 | 3/2005 | Block et al. |
| 2005/0059371 A1 | 3/2005 | Block et al. |

FOREIGN PATENT DOCUMENTS

| | | |
|---|---|---|
| DE | 32 13 437 | 10/1983 |
| DE | 43 44 333 A1 | 7/1994 |
| DE | 689 25 166 | 6/1996 |
| DE | 196 08 219 | 9/1996 |
| DE | 69515979 | 10/2000 |
| DE | 199 19 368 A1 | 11/2000 |
| DE | 199 31 056 | 1/2001 |
| DE | 199 44 489 | 4/2001 |
| EP | 176440 | 4/1986 |
| EP | 0 681 365 | 11/1995 |
| EP | 0 355 973 | 12/1995 |
| EP | 0 704 925 | 4/1996 |
| EP | 0 784 384 | 7/1997 |
| EP | 0 820 155 | 1/1998 |
| EP | 1 037 308 | 9/2000 |
| EP | 1 073 208 | 1/2001 |
| EP | 1 094 538 | 4/2001 |
| GB | 877040 | 4/1961 |
| GB | 2089173 | 10/1996 |
| GB | 2299892 | 10/1996 |
| JP | 48-9039 | 2/1973 |
| JP | 50-7788 | 3/1975 |
| JP | 52-9842 | 1/1977 |
| JP | 53-091439 | 7/1978 |
| JP | 62-098905 | 5/1987 |
| JP | 64-090601 | 4/1989 |
| JP | 03-036924 | 2/1991 |
| JP | 05-299209 | 11/1993 |
| JP | 06-077707 | 3/1994 |
| JP | 06112850 | 4/1995 |
| JP | 07-036548 | 7/1995 |
| JP | 09-200077 | 7/1997 |
| JP | 09-284168 | 10/1997 |
| JP | 10-032521 | 2/1998 |
| JP | 10-126281 | 5/1998 |
| JP | 10-126307 | 5/1998 |
| JP | 10-303314 | 11/1998 |
| JP | 11-027177 | 1/1999 |
| JP | 11-055156 | 2/1999 |
| JP | 11-206012 | 7/1999 |
| JP | 2000-156651 | 6/2000 |
| JP | 2000-196495 | 7/2000 |
| JP | 2000-196496 | 7/2000 |
| JP | 2000-228060 | 8/2000 |
| JP | 2000-236201 | 8/2000 |
| JP | 2000-278168 | 10/2000 |
| JP | 2001-044883 | 2/2001 |
| JP | 2001-044884 | 2/2001 |
| JP | 2001127663 | 5/2001 |
| JP | 2001-185902 | 7/2001 |
| JP | 2001-237372 | 8/2001 |
| JP | 2002-064401 | 2/2002 |
| JP | 2002-118487 | 4/2002 |
| JP | 2002-208873 | 7/2002 |
| SU | 502511 | 2/1976 |
| WO | WO98/47190 | 10/1998 |
| WO | WO 00/46931 | 8/2000 |
| WO | WO 00/57515 | 9/2000 |
| WO | WO 02/058239 | 7/2002 |
| WO | WO03/030382 | 4/2003 |
| WO | WO03/030383 | 4/2003 |

| WO | WO03/030384 | 4/2003 |
| WO | WO03/030386 | 4/2003 |

OTHER PUBLICATIONS

Gramegna, G. et al., "A Sub-1-dB NF ±2.3-kV ESD-Protected 900-MHz CMOS LNA", *IEEE Journal of Solid-State Circuits*, 36(7):1010-1017 (2001).
Steyaert, M.S.J. et al., "Low-Voltage Low-Power CMOS-RF Transceiver Design", *IEEE Transactions on Microwave Theory and Techniques*, 50(1):281-287 (2002).
Lucero, et al "Design of an LTCC Switch Diplexer Front-End Module for GSM/DCS/PCS Applications", IEEE Radio Frequency Integrated Circuits Symposium, May 20-22, 200, pp. 213-216.
Examination Report dated Apr. 5, 2007 from corresponding application.
English Translation of Int'l Preliminary Examination REport for Application No. PCT/DE2002/003665, dated Sep. 2, 2003.
English Translation of Examination Report dated Apr. 5, 2007.
Examination Report for Application No. DE 102 01 434 and English Summary.
International NORM IEC 61000-4-2; edited 1.2, Apr. 2001.
Machines Translation of JP2001-127663 (Hayakawa), 23 pgs.
Machines Translation of JP09-284168 (Sawai Tetsuo), 13 pgs.
Machine Translation of JP2000-156651 (Katagishi Makoto), 10 pgs.
Action and Response History retrieved from PAIR for U.S. Appl. No. 10/490,753, through Jul. 22, 2008.
Action and Response History retrieved from PAIR for U.S. Appl. No. 10/490,930, through Jul. 22, 2008.
Action and Response History retrieved from PAIR for U.S. Appl. No. 10/490,711, through Jul. 22, 2008.
Action and Response History retrieved from PAIR for U.S. Appl. No. 10/466,338, through Jul. 22, 2008.
English Translation of Examination Report in corresponding Application No. JP62-098905, dated May 31, 2007.
Examination Report in Japanese Application No. 2003-533457, dated Jun. 19, 2008.
Machine Translation of JP05-299209.
Machine Translation of JP07-036548.
Machine Translation of JP09-284168.
Machine Translation of JP10-303314
Machine Translation of JP2000-228060.
Machine Translation of JP2001-237372.
Machine Translation of Application No. JP2000-236201.
Examination REport in counterpart German Application No. DE101 48 016.4, dated Sep. 1, 2008.

\* cited by examiner

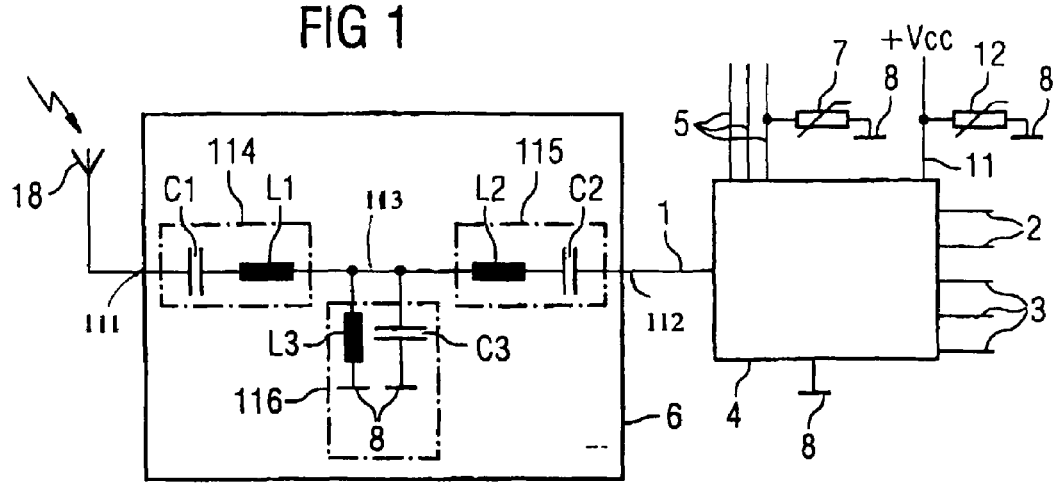
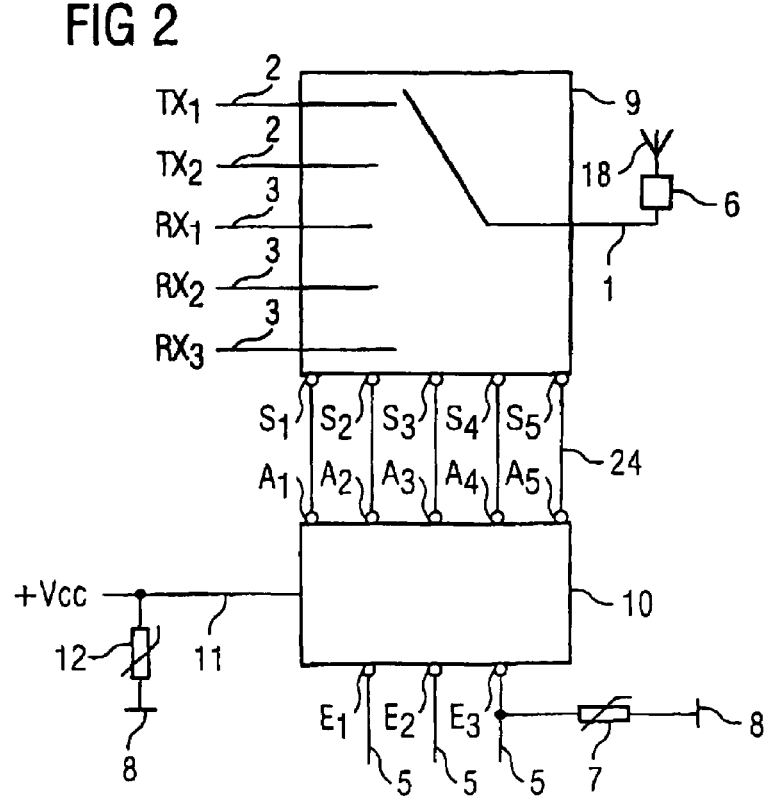

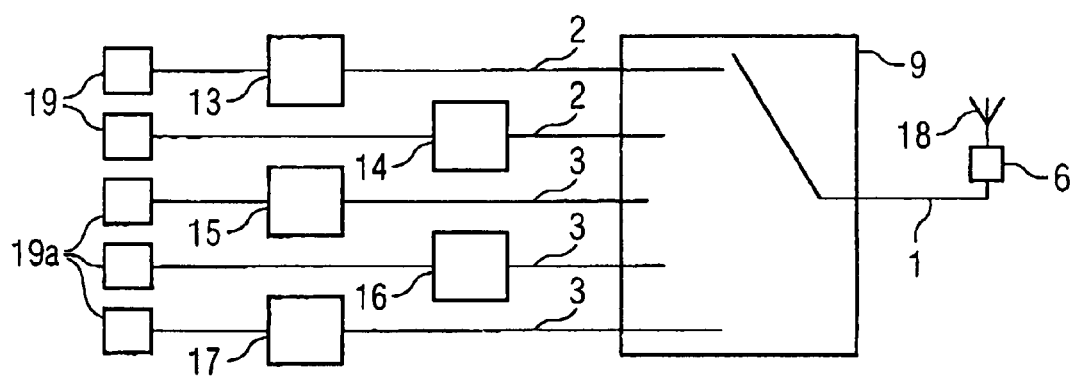
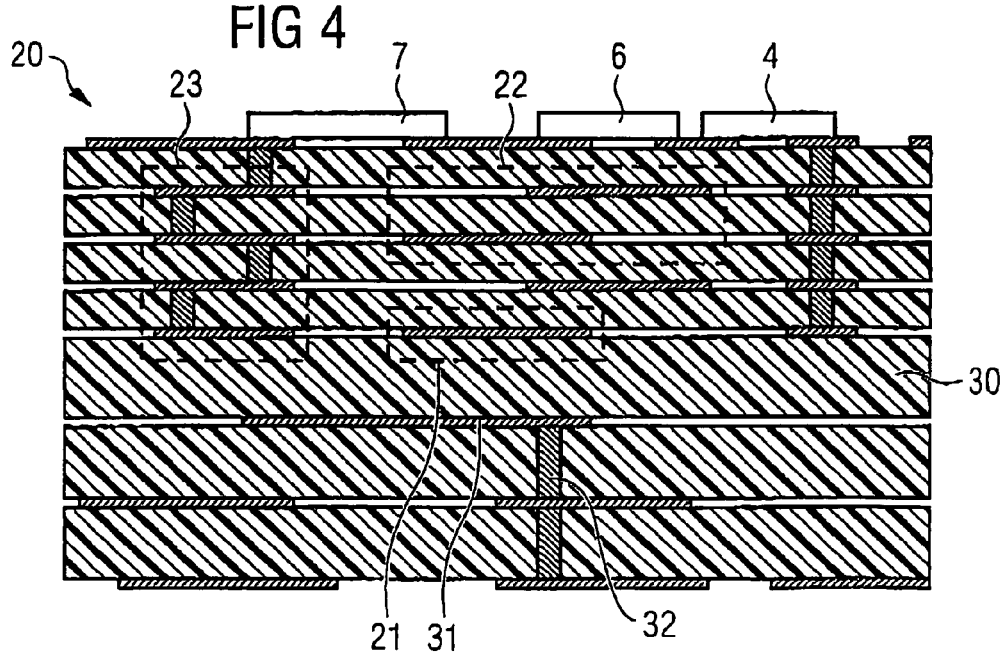

BANDPASS FILTER ELECTROSTATIC DISCHARGE PROTECTION DEVICE

TECHNICAL FIELD

This patent application describes a circuit array, which has an antenna input, a signal input and a signal output. The circuit array has a switch unit that optionally connects the antenna input with the signal input or the signal output.

BACKGROUND

Circuit arrays may be used as multi-band front-end modules for mobile telephones. For example, a circuit array may be connected to the antenna of a mobile telephone at the antenna input. When the antenna comes into contact with an electrically-charged user, this can result in electrostatic discharge (ESD). Electrostatic discharges can create voltage peaks that are capable of destroying the circuit array. Thus, it is beneficial to equip circuit arrays of the type mentioned above with a device that protects against ESD.

Printed specification WO 00/57515 discloses circuit arrays that are equipped with a device for protecting against ESD. The protective device comprises an electric high-pass filter in which a capacitor is connected in series and an inductor is connected in parallel to the antenna input path.

A drawback of the known circuit array is that the ESD protective device only helps reduce the ESD impulse entering the circuit array directly through the antenna. In addition to the impulse entering the circuit array directly through the antenna, an electrostatic discharge can also generate a high voltage in the circuit array through ground coupling. This can occur, for example, because the control input normally used in a circuit is arranged either on the high voltage (high) or on a low voltage (low). In this case, the high voltage (high) is defined, for example, by the fact that it lies 2.3 V above the ground voltage of the circuit array. Because, in the case of a mobile telephone, as with many other devices based on signal transmission via antennas, the signal input runs from the antenna to the system's ground, an electrostatic discharge can also directly affect the ground voltage of the circuit array in a circuit array of the type mentioned above. As a result of the directly coupling of a control line to ground through the "high" condition, the voltage impulse resulting from an electrostatic discharge can not only affect the path, via the antenna, but also the circuit array, via the control line. The known circuit array is not protected against these effects.

In addition, the high-pass filter used in a known circuit array has the characteristic of being a very simply designed filter that allows all frequency components of a signal, beginning with a certain cutoff frequency, to pass through it virtually unimpeded. In general, however, only a very narrow frequency range is relevant to the further processing of the signal received by the antenna in the mobile telephone. For example, frequencies of between 1 and 2 GHz are used in mobile telephones based on the GSM, PCN, or PCS standard. All other frequencies received by the antenna tend to be interfering and, therefore, must be filtered out. Accordingly, at least one band-pass filter is needed to make the signal captured by the circuit array mentioned above capable of being processed for a mobile telephone. The high-pass filter arranged in the known circuit array can only cut off frequencies below a certain cutoff frequency. For this reason, at least one filter circuit must be connected downstream from this filter, in order to remove the frequency range relevant to the mobile telephone from the signals received by the antenna.

An advantage of the known circuit array is that the high-pass filter circuit used to protect against ESD has an insertion loss, causing the wanted signals to undergo a certain attenuation, although cutting of the transmitted frequency band does not take place. A disadvantage of the known circuit array is a generally high insertion loss.

SUMMARY

A circuit array is described which contains a switch unit with an antenna input, a signal input, and a signal output. The switch unit is suitable for electrically connecting the antenna input with either the signal input or the signal output. In addition, a control line that controls the switch position in the switch unit can be arranged at the switch unit. Additionally, the antenna input is connected to a first protective device against electrostatic discharges.

The first protective device against electrostatic discharges is implemented in the form of a band-pass filter in a T configuration.

An advantage of a band-pass filter is that it has a high insertion loss below a first cutoff frequency and above a second cutoff frequency. As a result, frequencies can be effectively suppressed, especially low frequencies that contain the bulk of electrical output of the impulses generated by electrostatic discharge. By arranging a band-pass filter at the antenna input, at least the need for subsequent filters in the reception paths can be loosened, which results in a generally improved insertion loss.

In an advantageous embodiment, the first protective device has an antenna input and a switch output. The antenna input and switch output are connected to one another by a line. A first series circuit comprising an inductor and a capacitor is connected in series to a second series circuit comprising an inductor and a capacitor and is connected in series to the line. Between these two series circuits, a parallel circuit comprising an inductance with a capacitor with a ground is connected to the circuit array in parallel to the line.

A band-pass filter in a T configuration is achieved with the circuit array of the protective device described above.

To use the circuit array described herein in a mobile telephone in which frequencies based on the GSM or PCS standard are used, it is advantageous for the band-pass filter to have an attenuation less than 0.5 dB between 1 and 2 GHz. Outside this frequency range, the band-pass filter should have the highest possible attenuation (e.g. >20 dB at f>3.4 GHz).

The circuit array, together with the band-pass filter, is also advantageous in that, as a result of the two capacitors connected in series to the line, a DC voltage block is achieved that prevents DC voltage applied to the switch unit from being discharged to the ground. This effectively reduces the risk of a short circuit.

In an advantageous embodiment, the control line is also connected to a second protective device against electrostatic discharges. The advantage of this arrangement is that ESD interference penetrating into the circuit can be effectively prevented through ground coupling via the control line.

The protective devices against electrostatic discharges are advantageously connected to a ground connection, into which the excess voltage from the electrostatic discharges can be discharged.

The switch unit can, for example, be a voltage-controlled switch, such as the type normally used in mobile telephone because of its low power consumption. In particular, a gallium-arsenide switch can be used as the switch unit.

The switch unit can also have multiple signal inputs and outputs. Accordingly, multiple control lines are needed.

The circuit array can also be provided with a decoder, which can be used to reduce the number of control lines. Such a decoder normally requires a power supply, which is connected via a supply line. The ESD protection of such a circuit can be improved even further by connecting the supply line to a third protective device against electrostatic discharges.

The decoder can also be designed so that the voltages of the control lines are generated from the voltage of the supply line.

This can be accomplished via "pull-up resistors," for example. Then ESD protection can be simplified by providing only the power supply line with a second protective device. In this case, protection of the control lines is provided through the protection of the power supply.

The circuit array can also contain frequency filters that are assigned to individual signal inputs or signal outputs. They are especially suitable for filtering the frequencies received by the antenna on a mobile telephone in such a way that the signals conducted and filtered through the signal output can be processed further by the mobile telephone. The same applies to the signal inputs of the circuit array, which, in a mobile telephone, are used to transmit the voice signals generated in the mobile telephone to a receiver via the antenna.

The use of a voltage-limiting element, which is connected in parallel to the control line and is also connected to the ground potential, represents another option for a second protective device against electrostatic discharges. A voltage-limiting element can be a varistor, for example. A varistor has very low resistance beginning at a certain cutoff voltage, so that excess voltage against ground can be diverted. Varistors with low switching voltage are especially suitable, because this minimizes the residual voltage that occurs in a voltage impulse and loads the circuit array. For this reason, it is advisable to use varistors with a varistor voltage of between 4 and 20 V. Accordingly, the terminal voltage in a voltage impulse that loads the circuit array is about 8 to about 50 V. As a result, the circuit array can be reliably protected against destruction in the event of an ESD impulse.

Another possibility is to use a switch spark gap or a Z-diode as a second protective device against electrostatic discharges.

This patent application also describes a circuit array in which the antenna input is connected to an antenna, in which the signal output is connected to a receiving amplifier of a mobile telephone, and in which the signal input is connected to a transmission amplifier of a mobile telephone.

In addition, a circuit module is specified which contains a circuit array. The circuit module also contains a multilayer ceramic substrate with integrated passive components, which form electric frequency filters. These frequency filters are assigned to the signal inputs or outputs. The switch unit, which can, for example, be implemented with the aid of PIN diodes or in the form of a gallium-arsenide switch, is arranged on the upper side of the multilayer ceramic substrate. In addition, the first and, if applicable, second protective device against electrostatic discharges is integrated into the circuit module.

An advantage of the circuit module is that, as a result of the integration of the passive components into the ceramic substrate, as well as the integration of the protective device into the circuit module, a high degree of integration is achieved, which advantageously affects the space requirements of the circuit module. The integration of the first and, if applicable, second protective device into the circuit module can occur, for example, by mounting these components onto the surface of the ceramic substrate, adjacent to the switch unit.

In particular, it is also advantageous to use the circuit module as a front-end module in a mobile telephone.

In the following, the circuit array is explained in greater detail on the basis of example embodiments and the corresponding figures.

DESCRIPTION OF THE DRAWINGS

FIG. 1 shows, as an example, a circuit array in a basic circuit diagram.

FIG. 2 shows, as an example, another circuit array in a basic circuit diagram.

FIG. 3 shows, in a basic circuit diagram, the use of the circuit array in a mobile telephone.

FIG. 4 shows, as an example, the circuit module in a schematic longitudinal section.

DETAILED DESCRIPTION

FIG. 1 shows a circuit array with a switch unit 4, which is provided with a ground 8. The switch unit 4 has an antenna input 1, which is connected to an antenna 18. The antenna input 1 is connected to a first protective device 6, which is used for protecting against electrostatic discharges (the electrostatic discharges being indicated by the lighting symbol in FIG. 1). The switch unit 4 contains at least one control line 5, which controls the switching process for connecting the antenna input 1 with the signal inputs 2 or the signal outputs 3 of the switch unit 4. Three control lines 5 are shown in FIG. 1. At least one of these control lines is provided with a second protective device 7 against electrostatic discharges. These second protective device 7 is implemented in the form of a varistor, which is connected to the ground 8.

The switch unit 4 depicted in FIG. 1 also has a decoder, for which a supply line 11 is required. The supply line 11 is connected to a supply voltage +Vcc. In addition, the supply line 11 is connected to a third protective device 12 against electrostatic discharges. The third protective device 12 can, for example, be a varistor that is connected to the ground 8.

The first protective device 6 is implemented in the form of a band-pass filter in a T configuration. It has an antenna input 111 and a switch output 112. The antenna input 111 and the switch output 112 are connected to one another by a line 113. A series circuit 114, comprising an inductor L1 and a capacitor C1, as well as a second series circuit 115, comprising an inductor L2 and a capacitor C2, are connected in series to this line 113. Between the two series circuits 114, 115, a parallel circuit 116 comprising and inductor L3 and a capacitor C3 is connected in parallel to the line 113. The parallel circuit 113 is connected to the ground 8.

Such a filter can have the following component data:

L1=from 0.1 to 22 nH
L2=from 0.1 to 22 nH
L3=from 0.1 to 22 nH
C1=from 0.1 to 18 pF
C2=from 0.1 to 18 pF
C3=from 0.1 to 18 pF The capacitor C3 can also be replaced with a protective element, such as a varistor. Individual or multiple combinations LiCi can also be formed by transmission lines that are coupled together.

FIG. 2 shows a voltage-controlled GaAs switch 9 with an antenna input 1, to which an antenna 18 is connected. The GaAs switch 9 has transmitter inputs $TX_1$ and $TX_2$, and receiver inputs $RX_1$, $RX_2$, and $RX_3$. The GaAs switch 9 is controlled through control inputs $S_1$, $S_2$, $S_3$, $S_4$, and $S_5$. Control takes place in that exactly one of the control inputs $S_1$, $S_2$, $S_3$, $S_4$, and $S_5$ is set to "high," while the remaining control inputs are set to "low." The number of inputs needed can be reduced using the decoder 10 connected to the GaAs switch 9. The decoder 10 can be a 1-decoder or a 5-decoder, for example. It has control inputs $E_1$, $E_2$, and $E_3$, as well as control outputs $A_1$, $A_2$, $A_3$, $A_4$, and $A_5$. The control outputs $A_1$, $A_2$, $A_3$, $A_4$, and $A_5$ are connected inputs $S_1$, $S_2$, $S_3$, $S_4$, and $S_5$ of the GaAs switch 9 through connection lines 24.

The control inputs $E_1$, $E_2$, and $E_3$ of the decoder 10 are connected to the control lines 5.

An example of the decoder of a logical signal applied to one of the inputs $E_1$, $E_2$, and $E_3$ of the decoder 10 into signals applied to the control inputs $S_1$, $S_2$, $S_3$, $S_4$, and $S_5$ of the GaAs switch 9 that are suitable for controlling the GaAs switch is described by the following translation table:

TABLE 1

Logical states of the control inputs $S_1$, $S_2$, $S_3$, $S_4$, and $S_5$ as a factor of the logical states at the control inputs $E_1$, $E_2$, and $E_3$.
1 signifies "high" and 0 signifies "low."

| $E_1$ | $E_2$ | $E_3$ | → | $S_1$ | $S_2$ | $S_3$ | $S_4$ | $S_5$ |
|---|---|---|---|---|---|---|---|---|
| 0 | 0 | 0 |  | 1 | 0 | 0 | 0 | 0 |
| 0 | 0 | 1 |  | 0 | 1 | 0 | 0 | 0 |
| 0 | 1 | 0 |  | 0 | 0 | 1 | 0 | 0 |
| 0 | 1 | 1 |  | 0 | 0 | 0 | 1 | 0 |
| 1 | 0 | 0 |  | 0 | 0 | 0 | 0 | 1 |

In this case, the transmitter inputs $TX_1$, $TX_2$ correspond to the signal inputs from FIG. 1. The receiver inputs $RX_1$, $RX_2$, and $RX_3$ correspond to the signal outputs 3 from FIG. 1.

FIG. 3 depicts a circuit module with a GaAs switch 9, which has an antenna input 1 as well as two signal inputs 2 and three signal outputs 3. In addition, the circuit module has two low-pass filters 13, 14, wherein the low-pass filter 13 can be configured for the GSM frequency band and the low-pass filter 14 for the PCN/PCS frequency band. The GaAs switch 9 optionally connects one of the inputs/outputs 2, 3 with its antenna input 1. The circuit module also has band-pass filters 15, 16, 17, which are connected to the signal outputs 3. The band-pass filter 15 is adjusted to the GSM frequency, the band-pass filter 16 to the PCN frequency, and the band-pass filter 17 to the PCS frequency.

The band-pass filter 15, 16, 17 at the signal output 3 can be designed to be less demanding in terms of its specifications, because a portion of filtration is assumed by the ESD protective device. This improves insertion loss.

The signal inputs 2 of the GaAs switch 9 are electrically connected to transmitter amplifiers 19. The transmitter amplifiers 19, like the low-pass filters 13, 14, are adjusted to radio frequencies GSM and PCN/PCS, respectively. The signal outputs are electrically connected to receiver amplifiers 19a through the band-pass filters 15, 16, 17, wherein the receiver amplifiers 19a are adjusted to the frequency bands GSM, PCN and PCS, respectively. The antenna input 1 of the GaAs switch 9 is connected to an antenna 18. The signals received by the antenna 18 can now be fed, via GaAs switch 9, into the band-pass filter 16, the band-pass filter 17 or the band-pass filter 18, where they are filtered according to the radio frequency used and further processed in amplifiers 19a. The signals supplied by the transmitter amplifiers 19 are filtered by the low-pass filters 13, 14 and optionally supplied to the antenna 18 for transmission of a signal.

FIG. 4 shows a circuit module with a multilayer ceramic substrate 20, into which passive components 21, 22, 23 are integrated. These passive components 21, 22, 23 can include resistors, capacitors 22, and inductors 23, for example. The multilayer ceramic substrate 20 can be designed in a known manner. Stacked ceramic layers 30 separated by metallic layers 31 can be used as the multilayer ceramic substrate 20. A few of the metallic layers 31 are connected to one another through continuous contacts 32 running inside the ceramic layers 30. A switch unit 4, which, for example, can be a gallium-arsenide multiple switch assembled in flip chip technology, is mounted on the upper side of the ceramic substrate 20.

The switch unit 4 can, for example, be secured and electrically connected via gluing and additional wire-bonding. A GaAs multiple switch may be used as the switch unit 4. This type of switch can have an insertion loss of 0.8 dB in the frequency range between 1 and 2 GHz. It can be an integrated circuit with FET produced on a gallium-arsenide base, with its pin surfaces connected to the ceramic substrate 20 by soldering.

The switching unit 4 can also be attached to the multilayer ceramic substrate 20 and electrically bonded via wire bonding. Bonding by soldering may be used when the switch unit 4 is to be used with an additional housing.

The passive components 21, 22, 23 can form the filters 13, 14, 15, 16, 17 required in accordance with FIG. 3.

In addition the switch unit 4, the first protective device 6 and the second protective device 7 are also mounted onto the surface of the substrate 20. This accomplishes a high degree of integration for the circuit module, which advantageously reduces the space requirements of the circuit module.

The individual components of the first protective device 6 can be arranged on the upper side of the ceramic substrate 20. However, individual components, such as the capacitors C1, C2, C3, can also be integrated into the ceramic substrate 20, like the passive components 21, 22, 23.

The circuit array is not limited to the examples of the second and third protective device mentioned above, instead, all conceivable protective device can be used in the circuit array. In addition, the circuit array or the circuit module is not limited to applications in mobile telephones.

What is claimed is:

1. A circuit array comprising:
  a switch unit comprising:
    a first antenna input;
    a signal input; and
    a signal output;
  the switch unit for selectively connecting the antenna input to either the signal input or the signal output;
  a first protective device connected to the antenna input, the first protective device comprising a band-pass filter in a T configuration; and
  a control line for use in controlling the switch unit, the control line being connected to a second protective device, the second protective device comprising a voltage-limiting element for limiting a level of voltage applied to the switch unit irrespective of frequency.

2. The circuit array of claim 1, further comprising a signal line for electrically connecting an antenna with the first antenna input;
  wherein the first protective device comprises:
    a first series circuit, the first series circuit comprising a first inductor and a first capacitor connected in series to a second series circuit, the second series circuit comprising a second inductor and a second capacitor, the first series circuit and the second series circuit being connected in series to the signal line; and
    a parallel circuit comprising a third inductor and a third capacitor connected between the first series circuit and the second series circuit in parallel to the signal line, the parallel circuit being connected to a ground.

3. The circuit array of claim 1, wherein the band-pass filter has an attenuation approximately less than 0.5 dB over a frequency range between 1 and 2 GHz and an attenuating greater than 20 dB in a frequency range greater than 3.4 GHz.

4. The circuit array of claim 1, wherein the first and second protective devices are connected to a ground.

5. The circuit array of claim 1, wherein the switch unit comprises a voltage-controlled switch.

6. The circuit array of claim 5, wherein the switch unit comprises a gallium-arsenide switch.

7. The circuit array of claim 1, further comprising:
a decoder connected to the control line, the decoder having a supply line, the supply line being connected to a third protective device.

8. The circuit array of claim 1, further comprising:
frequency filters connected in series to at least one of the signal input and the signal output.

9. The circuit array of claim 1, wherein the voltage-limiting element comprises at least one of a varistor, a spark gap, and a Zener-diode.

10. The circuit array of claim of claim 9, wherein the varistor has a switching voltage of less than 6 V.

11. The circuit array of claim 1, wherein the antenna input is connected to an antenna, the signal input is connected to a transmission amplifier and the signal output is connected to a reception amplifier.

12. The circuit array of claim 1, wherein the first protective device is at least partly constructed on transmission lines that are coupled together.

13. The circuit array of claim 1, wherein the first protective device protects against electrostatic discharge.

14. A circuit module comprising:
a circuit array comprising:
a switch unit comprising:
an antenna input;
a signal input;
a signal output;
the switch unit for selectively connecting the antenna input to either the signal input or the signal output; and
a first protective device connected to the antenna input, the first protective device comprising a band-pass filter in a T configuration for protecting against electrostatic discharge; and
a multilayer ceramic substrate that includes integrated passive components that form frequency filters, wherein the switch unit is on an upper side of the ceramic substrate, the ceramic substrate including the first protective device.

15. The circuit module of claim 14, wherein the circuit module comprises a front-end module in a mobile telephone.

16. The circuit module of claim 14, further comprising
a control line for use in controlling the switch unit; and
a second protective device comprising a voltage-limiting element, the second protective device being connected to the control line.

17. The circuit module of claim 14, wherein the second protective device is part of the multilayer ceramic substrate.

18. The circuit module of claim 16, wherein the voltage-limiting element comprises at least one of a varistor, a spark gap, and a Zener-diode.

19. The circuit module of claim 18, wherein the varistor has a switching voltage of less than 6 V.

20. The circuit module of claim 14, further comprising a signal line for electrically connecting an antenna with the antenna input;
wherein the first protective device comprises:
a first series circuit, the first series circuit comprising a first inductor and a first capacitor connected in series to a second series circuit, the second series circuit comprising a second inductor and a second capacitor, the first series circuit and the second series circuit being connected in series to the signal line; and
a parallel circuit comprising a third inductor and a third capacitor connected between the first series circuit and the second series circuit in parallel to the signal line, the parallel circuit being connected to a ground.

21. The circuit module of claim 14, wherein the band-pass filter has an attenuation approximately less than 0.5 dB over a frequency range between 1 and 2 GHz and an attenuation greater than 20 dB in a frequency range greater than 3.4 GHz.

22. The circuit module of claim 14, wherein the switch unit comprises a voltage controlled switch.

23. The circuit module of claim 14, wherein the switch unit comprises a gallium-arsenide switch.

24. A circuit array comprising:
a switch unit comprising:
a first antenna input;
a signal input; and
a signal output;
the switch unit for selectively connecting the antenna input to either the signal input or the signal output;
a first protective device connected to the antenna input, the first protective device comprising a band-pass filter in a T configuration; and
a control lie for use in controlling the switch unit, the control line being connected to a second protective device, the second protective device comprising a voltage-limiting element, wherein the voltage-limiting element comprises at least one of a varistor, a spark gap, and a Zener-diode.

* * * * *